United States Patent [19]

Sarh

[11] Patent Number: 5,225,016
[45] Date of Patent: Jul. 6, 1993

[54] METHOD OF MANUFACTURING AN ADVANCED COMPOSITE DUCT HAVING INTEGRAL RIBS

[75] Inventor: Branko Sarh, Riverside, Calif.

[73] Assignee: Rohr Industries, Inc., Chula Vista, Calif.

[21] Appl. No.: 739,403

[22] Filed: Aug. 2, 1991

[51] Int. Cl.⁵ ............................................. B65H 81/00
[52] U.S. Cl. .................................... 156/156; 156/173; 156/175; 156/285; 264/314
[58] Field of Search ............... 156/156, 161, 173, 175, 156/285, 286; 264/102, 314, 523, 530, 534, 257, 258; 138/173

[56] References Cited

U.S. PATENT DOCUMENTS

| | | | |
|---|---|---|---|
| 3,033,730 | 5/1962 | Martin | 156/161 |
| 3,210,228 | 10/1965 | Bluck | 156/173 X |
| 3,303,079 | 2/1967 | Carter | 156/173 X |
| 3,833,699 | 9/1974 | Stefanka | 264/314 X |
| 3,962,394 | 6/1976 | Hall | 264/314 X |
| 4,113,828 | 9/1978 | Kramer, Sr. et al. | 264/314 X |
| 4,335,587 | 6/1982 | Thomamueller et al. | 156/161 X |
| 4,891,083 | 1/1990 | Denoel | 138/173 X |
| 4,986,863 | 1/1991 | Denoel et al. | 156/149 X |
| 5,106,442 | 4/1992 | Corr | 156/173 X |
| 5,135,596 | 8/1992 | Pabsch et al. | 156/173 X |

FOREIGN PATENT DOCUMENTS 8703534 6/1987 PCT Int'l Appl. ................. 156/156

Primary Examiner—Jeff H. Aftergut
Attorney, Agent, or Firm—P. J. Schlesinger; F. D. Gilliam; J. C. Cantor

[57] ABSTRACT

A method of making ducts having outwardly extending ribs formed integrally with the duct structure. Two tubes are formed from fiber reinforced resin materials, a uniform inner tube and a ribbed outer tube, then the inner tube is bonded with in the outer tube to form a high strength ribbed duct. An outer tube is formed by placing resin impregnated fibers over a cylindrical mandrel having an inflatable bladder on its surface, placing a plurality of spaced rings tightly against the outer surface, pressurizing the bladder to expand the tube into the spaces between rings to form low ribs, then gradually moving the rings toward each other to press the ribs therebetween and form thin upstanding ribs. The inner tube is formed by placing resin impregnated fibers on a slightly thinner mandrel that also has a surface bladder. When both tubes are formed, the mandrel is removed from the outer tube and the inner tube and mandrel are inserted therein and the inner tube bladder is inflated. The assembly is vacuum bagged and cured in an autoclave at a suitable temperature. The rings and mandrel are then removed and an integrally ribbed duct results. The thermosetting or thermoplastic resin impregnated fiber material may be placed on the mandrels by any suitable means such as filament winding, hand lay-up, or other deposition techniques.

11 Claims, 1 Drawing Sheet

METHOD OF MANUFACTURING AN ADVANCED COMPOSITE DUCT HAVING INTEGRAL RIBS

BACKGROUND OF THE INVENTION

The invention relates in general to the manufacture of fiber reinforced resin composite ducts and, more particularly, to an improved method for manufacturing such ducts with integrally formed upstanding ribs.

Ducts of various shapes are widely used in aerospace and other applications. Often it is necessary that the ducts combine the lightest possible weight with high strength. This may be accomplished by forming the tubular duct and adding appropriately spaced external reinforcing ribs. With metal ducts, the ribs are generally applied by welding or riveting the ribs to the structure, methods that are time consuming, require considerable skill and generally add undesirable weight to the structure.

Recently, ducts formed from high strength fibers imbedded in a plastic resin matrix have come into use due to their high strength to weight ratio. Typical of filament winding processes are those described by Bluck in U.S. Pat. No. 3,210,228 and Carter in U.S. Pat. No. 3,303,079.

Simple ducts may be rapidly formed using filament winding processes where a resin impregnated fiber tow is wound around a mandrel, cured and removed. Adding reinforcing ribs to such structures has proved difficult. Generally, toroidal rib rings are formed by hand lay up, then bonded to the duct with adhesives or are co-cured with the duct, thereby requiring considerable hand work and complex tooling. Further, ducts made by these techniques often have a relative weak bond between duct and rib, requiring the use of additional material, with attendant undesirable weight increases, to assure adequate strength.

Thus, there is a continuing need for an improved method of manufacturing ribbed composite ducts having increased strength and lighter weight while permitting more rapid and efficient manufacture.

SUMMARY OF THE INVENTION

It is, therefore, an object of this invention to provide a method of manufacturing advanced composite ribbed ducts having improved simplicity, uniformity and efficiency.

Another object is to provide a method of making ribbed ducts in which the ribs are integral with the duct for highest strength with lowest weight.

A further object is to provide a method of making ribbed ducts that have a high strength-to-weight ratio.

The above-noted objects, and others, are accomplished in accordance with this invention by a method in which, in a preferred embodiment, an inner advanced composite duct is made by filament winding and a second outer advanced composite duct having a generally cylindrical shape is formed by filament winding and reshaped to form integral ribs, then the inner duct, also having a generally cylindrical shape, is inserted into the outer duct and the assembly is co-cured under appropriate pressure and temperature to produce a high strength duct having a continuous smooth inner wall and integral exterior ribs.

The outer tube or duct is formed on a suitable generally cylindrically shaped mandrel having an inflatable surface bladder. A basic tube is formed, for example, by filament winding a resin impregnated tow or tow band onto the mandrel surface. The tube is filament wound in a helical pattern that permits localized deformation into radial rib shapes, as detailed below. Hoop winding of filaments should be avoided since such windings do not permit the required deformation.

A plurality of spaced rings are then clamped to the surface of the tube with spacers between adjacent rings, the spacers being out of contact with the tube along the outer edges of the rings. After this initial set up to accurately position the rings, the initial spacers are removed and replaced with narrower spacers which are out of contact with the ribs. As the internal bladder is pressurized, the rings are moved toward each other into contact with the narrow second spacers, resulting in shallow ribs forming by distortion of the helically wound tube between the rings. This procedure is repeated with progressively narrower spacers to carefully form progressively higher and thinner ribs. Finally, the spacers may be removed and the rings pressed together, to form thin ribs from the tube material.

As the material from the outer tube is thus distorted into the spaces between the rings it will be understood that the overall length of the tube will be lessened to accommodate the material being utilized to form the ribs.

Meanwhile, an inner tube of slightly less diameter is formed by, for example, filament winding on a mandrel having an inflatable surface bladder. When both tubes are complete, the mandrel is removed from the outer tube, then the assembly of inner tube and mandrel is inserted therein. If the resin is a preferred thermosetting resin, the assembly is vacuum bagged, the bladder on the inner mandrel is inflated and the resin is co-cured in an autoclave to produce an integrally ribbed duct having a smooth, uniform internal surface.

While the use of an inner tube within the integrally ribbed water tube is preferred for optimum strength, if desired the outer tube may be used alone in some applications. If a thermoplastic matrix resin is used, the resin will be kept above its softening temperature during the forming steps and co-consolidation of the two ducts and will be cooled to harden.

BRIEF DESCRIPTION OF THE DRAWINGS

Details of the invention, and of preferred embodiments thereof, will be further understood upon reference to the drawing, wherein.

DETAILED DESCRIPTION OF PREFERRED EMBODIMENTS

Figure 1:
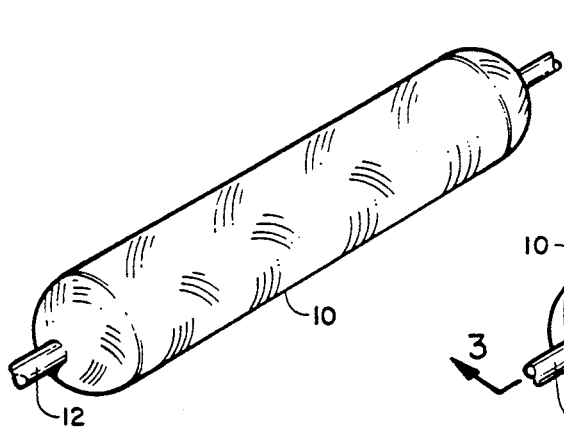
FIG. 1 is a schematic perspective of a filament wound tubular structure.
Figure 3:
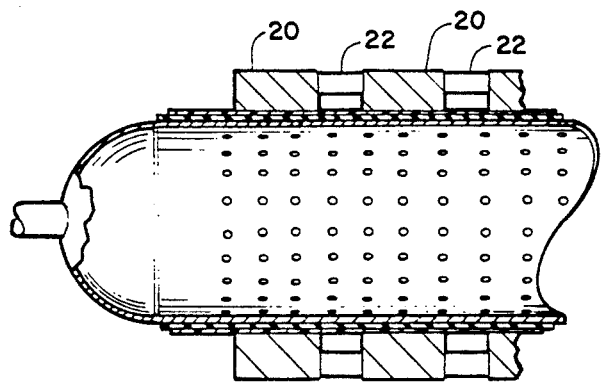
FIG. 3 is an axial section view through the assembly of FIG. 2, taken on line 3—3 in FIG. 2.
Figure 3A:
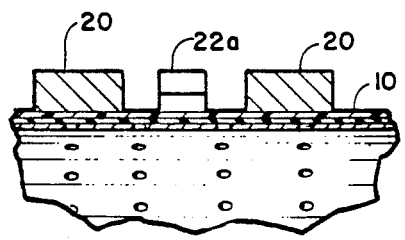
FIG. 3a is a detail section view of a portion of FIG. 3 showing the spacers replaced with narrower spacers.

As seen in FIG. 1 the first step is to deposit resin impregnated fibers, such as by filament winding in a helical pattern to form the basic outer tube 10 on a mandrel mounted for rotation on shaft 12. As best seen in FIG. 3, mandrel 14 includes an inner hollow core 16 that may be any suitable material, such as aluminum, having positioned over its surface an inflatable reusable elastic bladder 18. A plurality of small holes 17 may be provided through the wall of inner core 16 to provide internal pressurization of bladder 18. Alternatively, bladder 18 may also be the internally pressurized type, obviating the need for holes 17.

Tube 10 may be formed from any suitable high strength fibers, such as graphite, Kevlar aramid, or mixed fibers, in any suitable matrix resin such as suitable thermosetting resins in the "B-stage" degree of cure or suitable thermoplastic resins. The filament winding is conducted in a conventional manner, typically forming a helical fiber pattern without any hoop windings.

Figure 2:
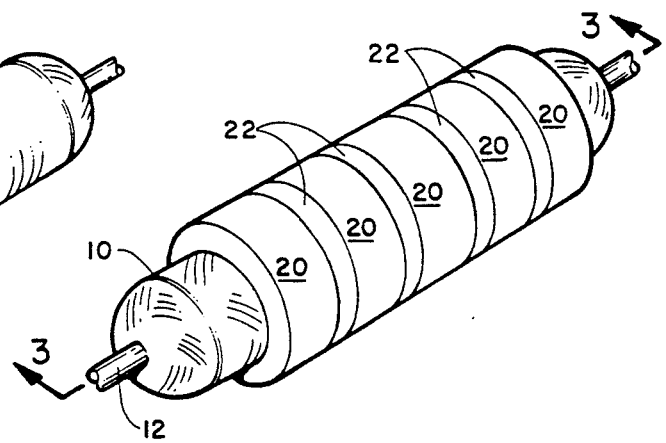
FIG. 2 is a schematic perspective of the tube of FIG. 1 with clamp rings and spacers in place.

Next, as shown in FIGS. 2 and 3, a plurality of spaced rings 20 is placed over outer tube 10. Rings 20 are preferably segmented to provide easy application and removal and are preferably clamped in place by conventional clamps, such as band clamps (not shown) around each ring. Rings 20 are uniformly spaced apart by spacers 22, which extend only partially into the space between adjacent rings 20 and are well out of contact with tube 10. The thicknesses of the various spacers 22 or rings 20 may be uniform or non-uniform to provide the pattern of ribs and rib heights desired for a particular application.

Figure 4:
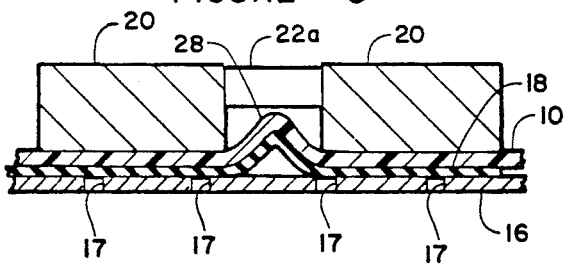
FIG. 4 is a detail section view as in taken as in FIG. 3 illustrating the initial rib forming step.

The first step in forming outwardly extending circumferential ribs integral with tube 10 is shown in a detail section view in FIG. 4. The original spacers 22 shown in FIG. 3 are removed and narrower spacers 22a are inserted in their place after the initial set-up has confirmed the correct placement of rings 20 and spacers 22a. Spacers will not fill the spaces between rings 20 and will be suspended within the space by any conventional means, such as sleeves, the ring clamps or other means (not shown) engaging the outer surface of rings 20. Then the rings 20, which are tightly clamped against the filament wound outer composite tube 10, are moved toward the center of the tube length as indicated by arrows 24 by any suitable conventional clamp or drive means (not shown) while bladder 18 is inflated to exert outward pressure on tube 10 as indicated by arrows 26. This causes the tube 10, which is in an uncured, pliable, deformable state, to stretch radially outwardly into the space between rings 20 to form initial ribs 28.

The width of the initial spacers 20 bears a direct relationship to the height of rib 28 to be formed. Where a thin, maximum height rib is formed, the final rib 28 will have a height approximately half the space between the adjacent rings 20. If the rib 28 is hollow or shallow, the rib will have a height less than one-half the spacing of those rings 20. Also, rings 20 are all simultaneously moved or translated toward the longitudinal center of the tubular preform 10 as bladder 16 deforms preform 10 radially to compensate for the amount of preform material that is being used to form radial ribs 28.

Figure 6:
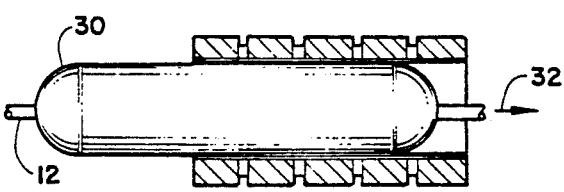
FIG. 6 is a section view taken as in FIG. 3 illustrating the insertion of the inner tube.

If only shallow, open ribs are desired, one could go immediately to the operation shown in FIG. 6. However, generally thin ribs of substantially uniform thickness are desired. In that case, spacers 22a are removed and still narrower spacers are inserted and the movement of rings 20 is repeated to increase the height and narrow the base of ribs 28.

Bladder 18 may be inflated during the first few steps of moving rings 20 against narrower spacers 22a, but as the ribs become narrower bladder 18 is no longer inflated, since it could be trapped within the thinner ribs. I have found that performing the rib forming in several steps results in ribs of more uniform quality, possibly because the stepwise forming allows time for any necessary slipping of fibers in the often viscous matrix resin. The number of steps required to produce an optimum structure with a particular combination of resin and fiber in tube 10 can easily be determined empirically with a short series of tests.

Figure 5:
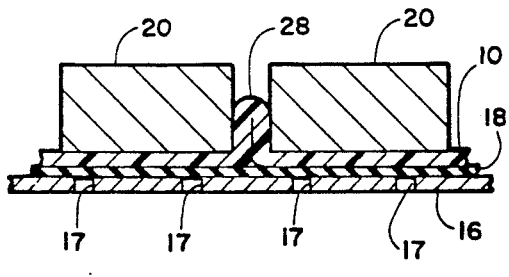
FIG. 5 is a detail section view taken as in FIG. 3 illustrating the final rib forming step.

Once the ribs 28 are fairly narrow, the spacers 22 are entirely removed, the bladder 18 is not inflated so that bladder material does not extend up into the narrow ribs 28 and rings 20 are brought tightly together as shown in FIG. 5. This final step produces ribs of even thickness, or any other desired configuration as determined by the shape and angle of the faces of rings 20 that press against ribs 28.

An inner tube or duct 30 is then formed in the same manner as shown in FIG. 1. The same sort of mandrel having an inflatable surface bladder is used, with the diameters of the assembled mandrel, bladder and inner tube 30 being selected so that the outer diameter of the inner tube is substantially equal to or slightly less than the inner diameter of the outer tube. So as to permit inner tube 30 to be easily slid into the deformed outer duct 10.

The final step is the insertion of inner tube 30 into outer tube 10. Inner tube 30 is formed on a mandrel 14 having a core 16, with holes 17 and a suitable reusable inflatable bladder 18 of the sort used to make outer tube 10. While any suitable combination of fiber and resin may be used in inner tube 30, generally, they are the same as used for outer tube 10. Inner tube 30 has an outside diameter substantially equal to the inner diameter of outer tube 10, or slightly less to provide easy insertion.

The closed ends of outer tube 10 are cut off and the inner tube 30 is inserted therein, as indicated by arrow 32. When fully inserted, bladder 18 is inflated and, if thermosetting resins are used, the assembly is heated to the curing temperature of the resin. While cure may be accomplished in any suitable manner, generally it is done by vacuum bagging the assembly and heating it to the curing temperature for an appropriate time while being subjected to a predetermined pressure.

If thermoplastic resins are used for the manufacture of the duct, the assembly as shown in FIG. 6 is held at the softening temperature of the resin, bladder 18 if inflated to press inner tube 30 against ribbed outer tube 10 for co-consolidation of tubes 10 and 30 and the assembly is allowed to cool to solidify the tubes which are bonded to form a single unitary duct.

Figure 7:
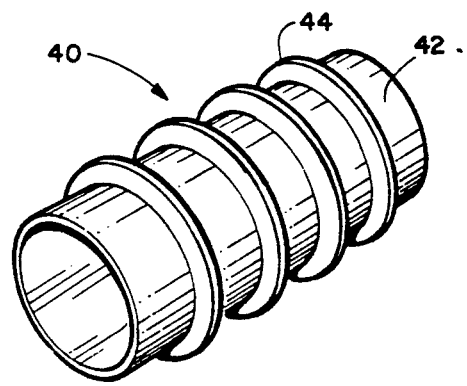
FIG. 7 is a perspective of the final integrally ribbed duct.

The ends of inner tube 30 are cut off, mandrel 14 is removed, the rings 14 are removed, any flash such as might have formed between ring segments is trimmed and the integrally ribbed duct 40 as shown in FIG. 7 is complete. Duct 40 has a multi-layer tube 42 and a plurality of highly uniform ribs 44 that are integral with the outer layers of tube 42 so that the attachment lines between ribs and tube are of the highest possible strength.

While duct 40 is shown as a unitary duct having integral ribs resulting from the unique process of this invention and an inner tube bonded to the formed outer duct, if desired the inner duct could be omitted. While the method of filament winding tubes 10 and 30 described above are preferred, if desired, those tubes could be formed from other materials by other methods, so long as the material of outer tube 10 is capable of the required deformation in the method of this invention. For example, one or both of tubes 10 and 30 could be formed by processes such as tape laying, injection molding, resin transfer molding and the like. If desired, the basic tubes 10 and 30 could be made by conventional hand lay-up of fiber containing pre-preg materials. Any suitable means may be used for moving rings 20 toward each other, such as a lead screw mechanism. While the above description of preferred embodiments illustrate formation of rings on the exterior of the duct, ribs could be formed on the interior of a duct by this method.

Other applications, variations and ramifications of this invention will occur to those skilled in the art upon reading this disclosure. Those are intended to be included within the scope of this invention, as defined in the appended claims.

I claim:
1. A method of manufacturing a tube with integral ribs which comprise the steps of:
preparing a tube preform by placing resin impregnated fibers in a selected pattern over a cylindrical mandrel having an inflatable bladder disposed on its surface;
placing a plurality of spaced rings against said tube preform;
placing a plurality of spacers of selected thickness between said rings to provide space between said rings;
clamping said spaced rings tightly against the surface of said tube preform;
inflating said bladder to cause said tube preform to expand into the space between said rings to form shallow ribs;
deflating said bladder and removing said spacers;
moving said rings together into pressure contact with said ribs;
removing said mandrel;
hardening said resin; and
removing said rings to form a unitary tube with integral ribs.

2. The method according to claim 1 further including, after the formation of said shallow ribs, at least once removing said spacers, replacing them with thinner spacers and moving said rings towards each other into contact with said spacers to increase height and decrease width of said ribs.

3. The method according to claim 1 wherein said resin is a thermosetting resin and said resin is hardened by vacuum bagging and heating said assembly to a suitable curing temperature in an autoclave.

4. The method according to claim 1 wherein said resin is a thermoplastic resin having a resin softening and solidification temperature and including the step of heating said impregnated fibers to the resin softening temperature prior to the forming steps and maintaining the preform at that temperature for consolidation, the reducing the temperature to the solidification temperature of the resins.

5. A method of manufacturing ducts with integral ribs which comprises the steps of:
preparing an inner tube preform by placing resin impregnated fiber in a selected pattern over a surface of a first cylindrical mandrel having a first inflatable surface bladder;
preparing an outer tube preform by placing resin impregnated fiber in a selected patter over a surface of a second cylindrical mandrel having a second inflatable surface bladder;
the inside diameter of said outer tube preform being less than the outside diameter of said inner tube preform;
placing a plurality of spaced rings against said outer preform;
placing a plurality of spacers of selected thickness between said rings to provide space between said rings;
clamping said spaced rings tightly against the surface of said outer preform;
inflating said second bladder to cause said second tube preform to expand into the space between said rings to form shallow ribs;
moving said rings together into pressure contact with said ribs;
removing said second mandrel;
inserting said first mandrel and inner tube preform into said second tube preform;
inflating said first bladder to press said inner tube preform tightly against said outer tube preform;
curing said rings in said preform; and
removing said rings to from a unitary duct with integral ribs.

6. The method according to claim 5 further including, after the formation of said shallow ribs, at least once removing said spacers, replacing them with thinner spacers and moving said rings towards each other into contact with said spacers to increase height and decrease width of said ribs.

7. The method according to claim 5 wherein said rings are thermosetting resins and said reins are cured by vacuum bagging and heating said assembly to suitable temperatures in an autoclave.

8. The method according to claim 5 wherein said resins are thermoplastic resins having a resin softening and solidification temperature and including the step of heating said impregnated fibers to the resin softening temperature prior to the forming steps and maintaining the preforms at that temperature until consolidation, then reducing the temperature to the solidification temperature of the resins.

9. The method of manufacturing ducts having integral ribs which comprise the steps of:
preparing an inner tube preform by placing resin impregnated fibers in a selected pattern over a surface of a first cylindrical mandrel having a first inflatable surface bladder;
preparing an outer tube preform by placing resin impregnated fibers in a selected pattern over a surface of a second cylindrical mandrel having a second inflatable surface bladder;
the inside diameter of said outer tube preform being no less than, the outside diameter of sid inner tube preform;
placing a plurality of spaced rings against said outer tube preform;
placing a plurality of spacers of selected thickness between said rings to provide space between said rings;
clamping said spaced rings tightly against the surface of said outer tube preform;

inflating said second bladder to cause said second tube preform to expand into the space between said rings to form shallow ribs;

at least once replacing said spacers with narrower spacers and moving rings together into contact with the narrower spacers to form ribs with increasing heights and widths;

after the selected number of steps of replacing spacers and moving rings together, removing the spacers entirely and moving said rings together into contact with said ribs;

removing said second mandrel;

inserting the first mandrel and inner tube preform into said second tube preform;

inflating said first bladder to press said inner tube preform tightly against said outer tube preform;

curing said resins in said preform and removing said rings to form a unitary duct with integral ribs.

10. The method according to claim 9 wherein said resins are thermosetting resins and said resins are cured by vacuum bagging and heating said assembly to a suitable temperature in an autoclave.

11. The method according to claim 9 wherein said resins are thermoplastic resins and including the step of heating said impregnated fibers to the resin softening temperature prior to the forming steps and maintaining the preforms at that temperature until consolidation, then reducing the temperature to the solidification temperature of the resins.

* * * * *